United States Patent [19]
Gorim

[11] Patent Number: 5,238,079
[45] Date of Patent: Aug. 24, 1993

[54] STEERING SYSTEM FOR VEHICLES

[75] Inventor: Alexander Gorim, Rishon Lezion, Israel

[73] Assignee: Israel Aircraft Industries Ltd., Lod, Israel

[21] Appl. No.: 685,654

[22] Filed: Apr. 16, 1991

[30] Foreign Application Priority Data

Feb. 20, 1991 [IL] Israel ............................... 097314

[51] Int. Cl.⁵ ............................................. B62D 5/06
[52] U.S. Cl. .................................. 180/142; 180/79.1
[58] Field of Search ....................... 180/79.1, 142, 143

[56] References Cited

U.S. PATENT DOCUMENTS

| 3,983,953 | 10/1976 | Bayle | 180/79.1 |
| 4,789,040 | 12/1988 | Morishita et al. | 180/79.1 |
| 4,804,057 | 2/1989 | Saeed | 180/79.1 |
| 4,887,682 | 12/1989 | Drutchas et al. | 180/79.1 |
| 4,940,107 | 7/1990 | Hanisko | 180/79.1 |
| 4,989,683 | 2/1991 | Morishita | 180/79.1 |
| 5,040,630 | 8/1991 | Morishita et al. | 180/79.1 |
| 5,067,576 | 11/1991 | Bober | 180/79.1 |

Primary Examiner—H. Grant Skaggs
Attorney, Agent, or Firm—Browdy and Neimark

[57] ABSTRACT

A wheeled vehicle including manually operated steering apparatus including apparatus for transmitting manual steering instructions to the vehicle wheels, and apparatus for providing electrically powered assistance to the manually operated steering apparatus.

4 Claims, 4 Drawing Sheets

STEERING SYSTEM FOR VEHICLES

FIELD OF THE INVENTION

The present invention relates to power assisted steering systems for vehicles.

BACKGROUND OF THE INVENTION

Power assisted steering systems are provided in many vehicles, and serve to reduce the turning force that the operator of a vehicle has to apply to the steering wheel in order to steer the vehicle. The turning force required or steering depends, inter alia, on the friction between the vehicle tires and the road. This, in turn, depends on factors such as the velocity at which the vehicle is travelling and the conditions of the road surface.

Conventional power assisted steering systems are hydraulically operated, and are thus relatively complex systems, and require periodic maintenance. Hydraulic power assisted steering systems also account for a relatively large proportion of the cost of the vehicle in which they are employed.

SUMMARY OF THE INVENTION

The present invention seeks to provide an electrical power assisted steering system for a vehicle, overcoming disadvantages of conventional hydraulic power assisted steering systems.

There is provided, therefore, in accordance with the invention, power assisted apparatus for a wheeled vehicle including manually operated steering apparatus including apparatus for transmitting manual steering instructions to the vehicle wheels, and apparatus for providing electrically powered assistance to the manually operated steering apparatus.

Additionally in accordance with an embodiment of the invention, the manually operated steering apparatus includes a steering column; a steering wheel associated with the steering column and arranged for manual operation; and apparatus for transmitting to the vehicle wheels, a torque applied as a turning force to the steering wheel and to the steering column; and the apparatus for providing electrically powered assistance includes electrical drive apparatus, associated with the manually operated steering apparatus, for selectably applying torque thereto in response to the application of a turning force to the steering wheel.

Further in accordance with an embodiment of the invention, the electrical drive apparatus is arranged for selectable axial rotation of the steering column and is loosely coupled thereto, thereby not interfering with manual steering when the electrical drive apparatus is inoperable.

Additionally in accordance with an embodiment of the invention, the electrical drive apparatus includes an electric motor associated with the steering column; apparatus for driving the electric motor; and computerized control apparatus for activating the apparatus for driving in accordance with predetermined parameters, and in response to the application to the steering wheel of a turning force causing application to the steering column of a torque of at least a predetermined magnitude.

In accordance with a further embodiment of the invention, there is provided a method of power steering a vehicle having wheels, including the steps of a manually transmitting manual steering instructions to the vehicle wheels; sensing the step of manually transmitting; and providing electrically powered steering instructions to the vehicle wheels, thereby assisting the manual steering thereof.

Additionally in accordance with the further embodiment of the invention, the ground vehicle also has manual steering apparatus which includes a steering column and a manually rotatable steering wheel associated with the steering column, and apparatus for transmitting to the vehicle wheels a turning force applied to the manual steering apparatus, the sep of sensing includes the step of sensing the application of a turning force to the steering apparatus; and the step of providing electrically powered steering instruction includes the steps of calculating a torque to be applied by non-manual apparatus, in accordance with predetermined parameters; electrically generating a torque corresponding to the value of calculated torque; and applying the generated torque to the steering apparatus.

Further in accordance with further embodiment of the invention, the method also includes the additional steps of sensing the torque applied to the steering column prior to the step of calculating, and preventing the step of applying when the applied torque is less than a predetermined threshold value.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Figure 1:
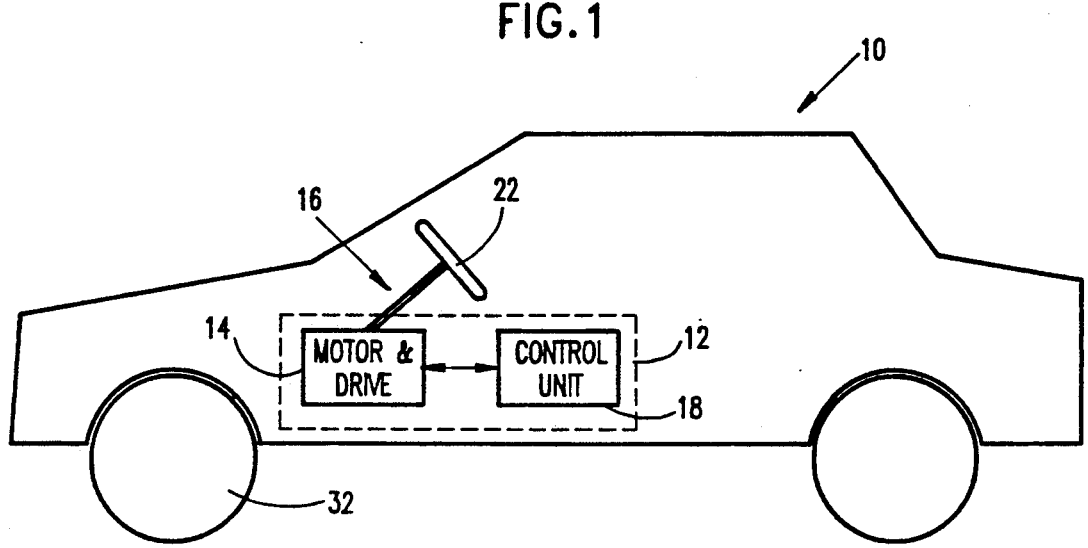
FIG. 1 is a schematic illustration of a vehicle employing an electrical power assisted vehicel steering system, constructed in accordance with the present invention.

Referring now to FIG. 1, there is shown a vehicle, reference generally 10, employing an electrical power assisted vehicle steering system, reference 12, constructed in accordance with an embodiment of the present invention. System 12 includes an electric motor and drive unit 14, which is associated with a steering column 16. Operation of unit 14 is controlled by a computerized control unit 18.

Figure 2:
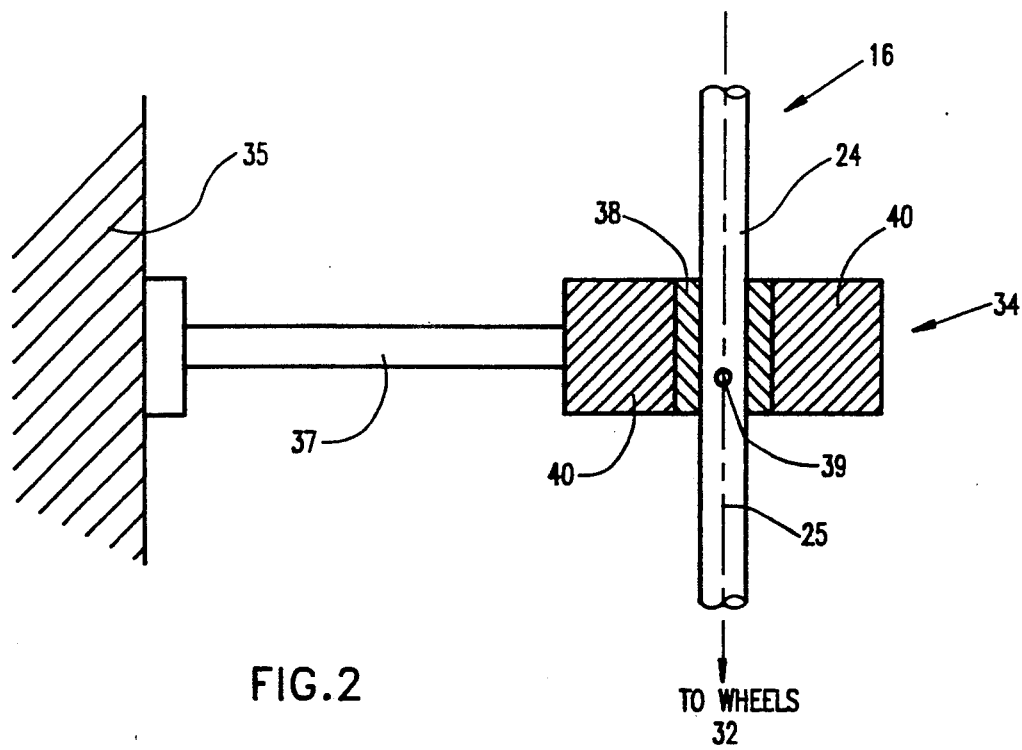
FIG. 2 is a schematic illustration of the electrical power drive depicted in FIG. 1.
Figure 3:
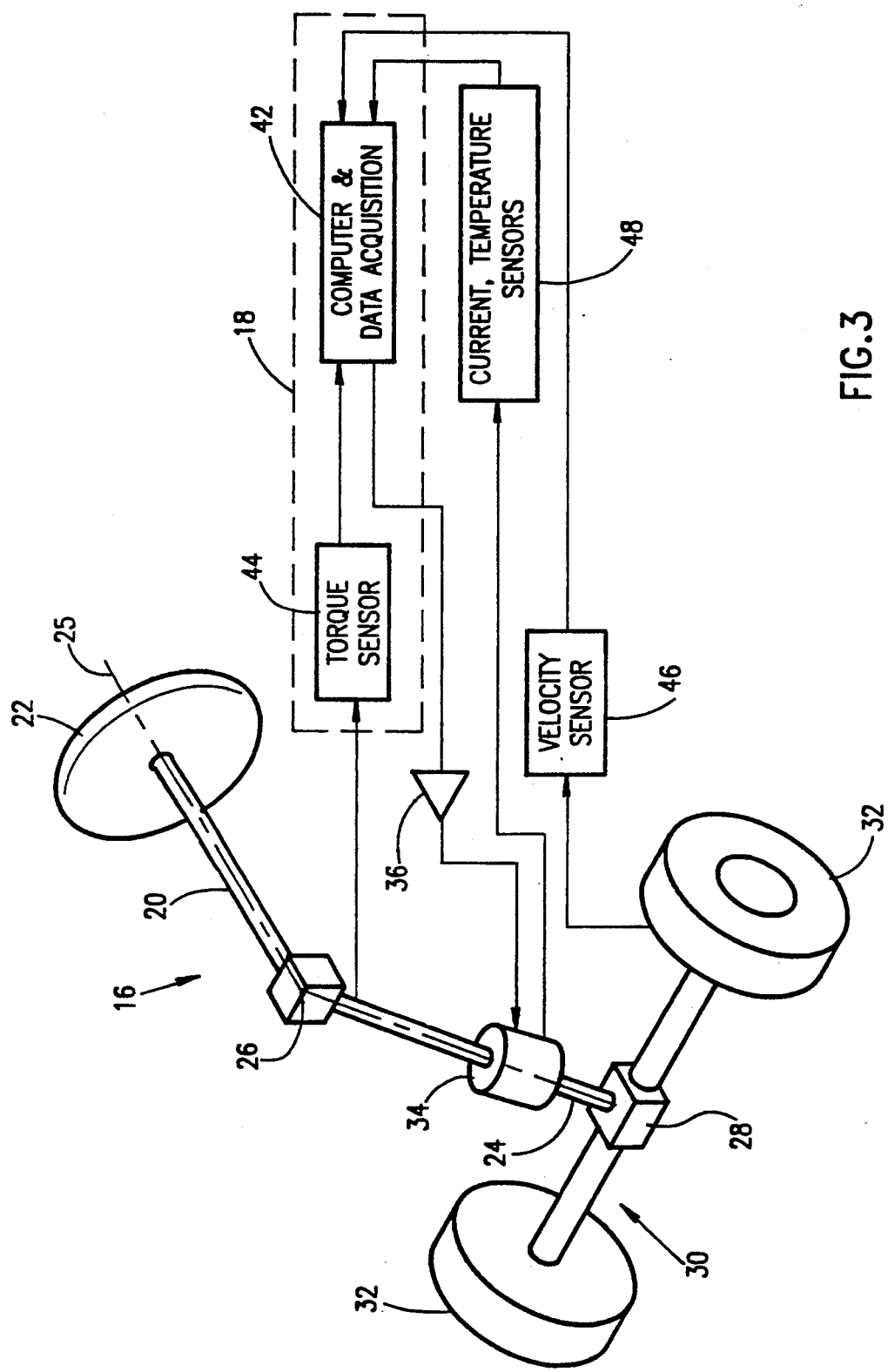
FIG. 3 is a detailed block diagram illustration of the electrical power assisted vehicle steering system illustrated in FIG. 1.

Referring now also to FIGS. 2 and 3, steering column 16 includes a steering column shaft 20 (FIG. 3), to one end of which is connected a steering wheel 22 (FIG. 3). Steering column 16 further includes an intermediate shaft 24, to which shaft 20 is connected via an upper universal joint 26. Intermediate shaft 24 is also connected, via a lower universal joint 28 (FIG. 3), to a rack assembly 30 (FIG. 3), which is operative to transfer a steering motion to front wheels 32 (FIGS. 1 and 3) of the vehicle 10 (FIG. 1).

Electric motor and drive unit 14 includes a motor 34, typically a DC brushless motor, for example, and a power driver 36 (FIG. 3), which energizes motor 34 in response to signals received from control unit 18. This is described more fully hereinbelow, with reference to FIGS. 4 and 5.

Referring now particularly to FIG. 2, motor 34, which, in the resent embodiment, is a DC brushless motor, includes a rotor 38 and stators 40. Typically, although not necessarily, rotor 38 is made from samarium-cobalt, which is characterized by producing a field of high magnetic flux relative to the size of the rotor.

Motor 34 is typically rigidly mounted onto a portion of the vehicle chassis 35 adjacent to steering column 16, as by a suitable counting, shown schematically at 37. According to a preferred embodiment, rotor 38 either forms apart of steering column 16 or is rigidly connected thereto, by any suitable means, such as a roll pin 39, for example, such that axial rotation of the rotor causes a corresponding axial rotation steering column 16 about tis longitudinal axis 25. Accordingly, operation of the motor causes the application of a torque to steering column 16 so as to apply a turning or steering force to wheels 32, via lower universal joint 28 and rack assembly 30.

In addition to providing direct control of the torque applied to the steering column, and, therefore, of the amount of powered assistance provided to the vehicle operator, the described construction, wherein the motor is loosely coupled to the steering column, permits manual steering in the event that the system malfunctions.

Referring now to FIG. 3, control unit 18, is operative, in accordance with predetermined criteria, to determine the amount of torque to be applied to steering column 16, thereby reducing the amount of torque that a vehicle operator has to apply to the steering wheel 22 in order to steer the vehicle.

Control unit 18 includes a computer and data acquisition unit 42, which may be any suitable computer; a torque sensor 44, such as a load cell, which is operative to sense the amount of torque applied to the steering column 16; and a plurality of other devices for sensing various predetermined vehicle operation parameters which may be useful in determining the amount of torque to be applied to the steering column 16 via motor 34. These sensing devices typically includes a vehicle velocity sensor 46, which may be, for example, vehicle velocity sensing apparatus conventionally provided in vehicles.

In additional, as indicated at block 48, monitoring devices may be provided for sensing the current and temperature of the motor 34. Devices may also be provided for sensing, inter alia, road surface conditions, atmospheric humidity, tire pressure etc.

Figure 4:
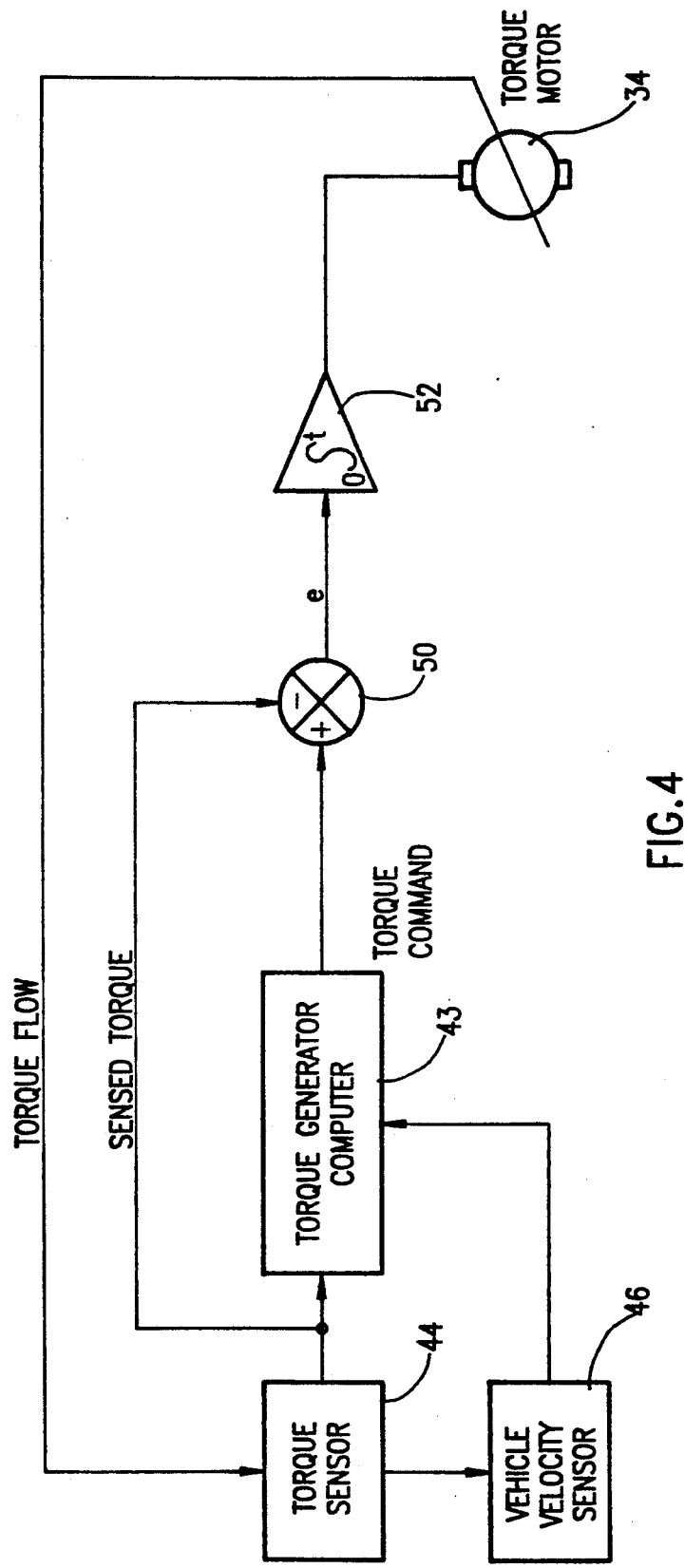
FIG. 4 is a generalized block diagram representation of the operation of the electrical power assisted steering system of FIG. 3.

Reference is now made to FIG. 4, which is a diagrammatic representation of the operation of the electrical power associated steering system of the present invention. In the present block diagram, computer and data acquisition unit 42 (FIG. 3) comprises a torque generator computer 43, a summer 560, and an integrator filter 52, the respective functions of which are described hereinbelow.

When steering a vehicle in which the steering system of the invention is employed, a vehicle operator turns the steering wheel 22 (FIG. 3) in a selected direction, thereby applying a torque to the steering column 16 (FIG. 3). Torque sensor 44 sense the torque applied to the steering column, and provides this as input to computer 43, as well as to summer 50. Computer 43 is also operative to receive data relating to predetermined parameters. These parameters include the vehicle velocity, as sensed by velocity sensor 46.

According to pre-programmed criteria, computer 43 calculates the amount of torque to be applied to the steering column 16 by motor 34, and provides this, via summer 50 and integrator filter 52, to power driver 36, as an output signal or 'torque command'.

The summer 50 calculates the difference between the calculated torque and the actual torque, and the result is provided, via integrator filter 52, to power driver 36 in the form of an electrical signal. The power driver is operative to power motor 34 in accordance with electrical signal, thereby supplying a required amount of torque compensation or assistance to the operator. It will be appreciated that summer 50 forms part of a closed calculations loop that permits a continuous updating of the compensation or assistance to be provided by the system to the operator. The function of integrator filer 52 is to reduce the error between the required (command) torque and the generated torque, as well as to stabilize the system in closed loop operation.

Figure 5:
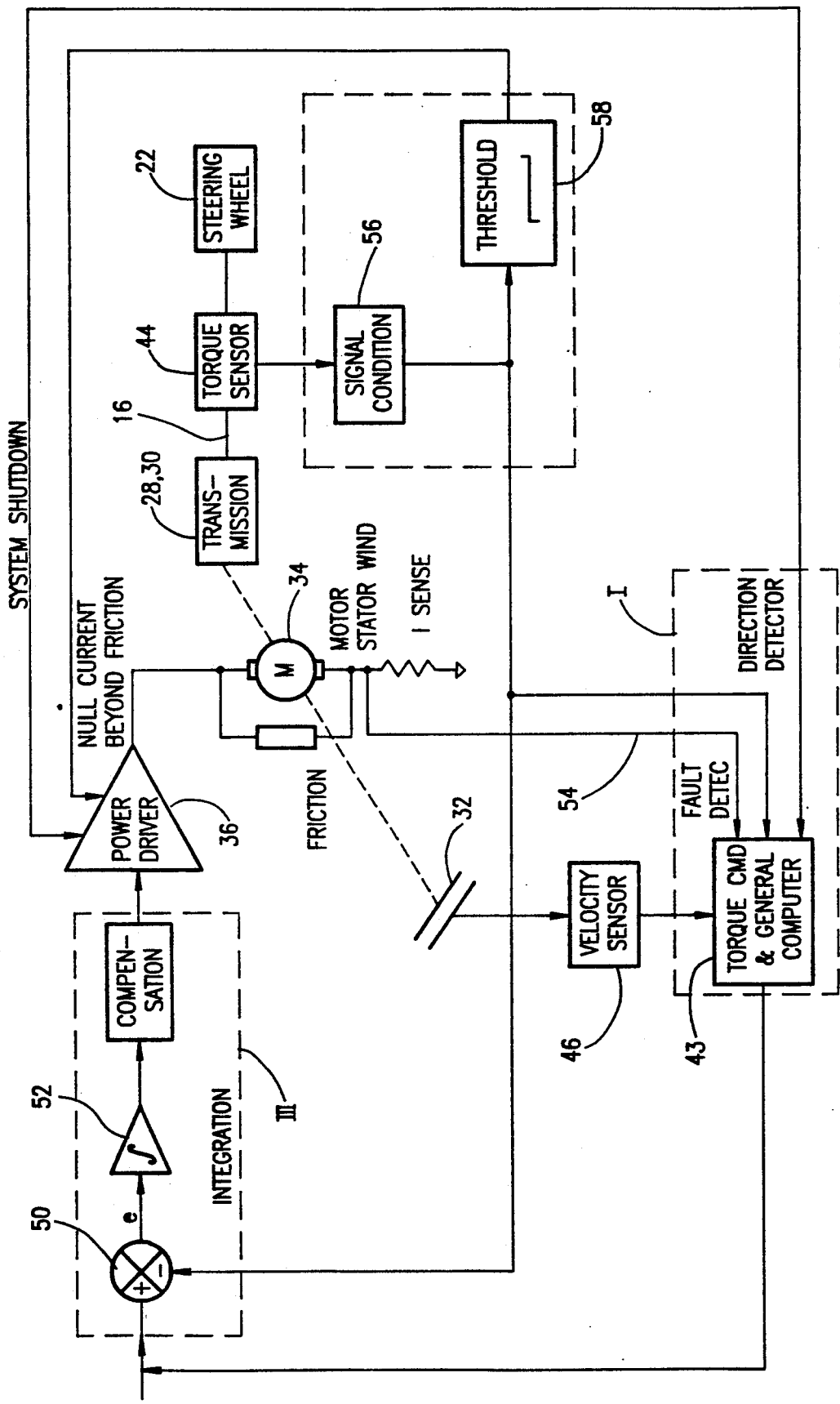
FIG. 5 is a more detailed block diagram of the operation of the electrical power assisted steering system of FIG. 3.

Reference is now made to FIG. 5, which is a more detailed block diagram representation of the operation of the electrical power assisted steering system of the present invention. Computer and data acquisition unit 42 (FIG. 3) and its various functions, are represented in FIG. 5 by block I, II and III. block I includes computer 43, which is operative to receive the following data: vehicle velocity, provided from velocity sensor 46; the torque applied to the steering column 16 and the direction in which the torque is being applied; and motor output data, indicated by line 54, which provides the systems with a fault detection capability.

The actual torque applied, including the direction in which it is applied, is sensed by torque sensor 44, and is provided as an output signal to computer 43, via a signal conditioner 56, shown in block II. Signal conditioner 56 may include an amplifier, and a lower pass filter for removing background noise from the output signal from torque sensor 44.

The output signal from the signal conditional 56 is provided simultaneously to threshold circuitry 58, which checks that at least a predetermined torque is being applied to the steering column. If the applied torque does not exceed a predetermined threshold value, then a 'system shutdown' command is provided to power driver 36, thereby preventing operation of motor 34.

The motor output data, whose provision to computer 43 is indicated by line 54, as described hereinabove, concerns the operation of the motor 34. In particular, this data includes current and temperature readings of the motor. In the vent that these readings fall outside predetermined ranges, computer 43 shuts down the system.

It will be appreciated by persons skilled in the art that the scope of the present invention is not limited to what has been particularly shown and described hereinabove, by way of example. The scope of the present invention is limited, rather, solely by the claims, which follow.

I claim:

1. Power assisted steering apparatus for a vehicle having wheels comprising:
   manually operated steering means including:
   a steering column;
   a steering wheel associated with said steering column and arranged for manual operation; and means for transmitting to the vehicle wheels a torque applied to said steering wheel and to said steering column; and electrical drive means associated with said manually operated steering means and which comprises:

a brushless motor arranged to provide selectable axial rotation of said steering column and loosely coupled thereto, thereby to not interfere with manual steering when said electrical drive mans in inoperable;

means for driving said brushless motor;

computerized control means for activating said means for driving in accordance with predetermeind variable parameters and further in response to the application to said steering wheel of a turning force which causes application to said steering column of a torque of at least a predetermined magnitude;

means, associated with said computerized control means, for sensing the torque applied to said steering column; and means, forming part of said computerized control means and adapted to receive an input from said means for sensing torque, for preventing operation of said brushless motor when the torque applied via said steering wheel is less than a predetermined threshold value, and wherein said brushless motor is a DC brushless motor having a rotor formed integrally with said steering column.

2. Apparatus according to claim 1, wherein said rotor is formed of rare earth magnets.

3. Apparatus according to claim 1, and wherein said said predetermined variable parameters include vehicle velocity, and wherein there is also provided means, associated with said computerized control means, for sensing the velocity of the vehicle.

4. Apparatus according to claim 1, and wherein said computerized control means also comprises:

means for calculating, in accordance with the predetermined parameters, the torque to be applied by said electric motor to said steering column; and summing means or adjusting the torque to be applied in accordance with the magnitude of the torque sensed by said means for sensing torque.

* * * * *